US012040924B1

(12) United States Patent
De Ruijter et al.

(10) Patent No.: US 12,040,924 B1
(45) Date of Patent: Jul. 16, 2024

(54) CLUSTER CORRELATOR FOR A DEMODULATOR

(71) Applicant: Silicon Laboratories Inc., Austin, TX (US)

(72) Inventors: Hendricus De Ruijter, Roseville, CA (US); Robert Gorday, Gainesville, FL (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 18/172,913

(22) Filed: Feb. 22, 2023

(51) Int. Cl.
*H04L 27/22* (2006.01)
*H03H 7/00* (2006.01)
*H04L 27/233* (2006.01)

(52) U.S. Cl.
CPC ...... *H04L 27/2334* (2013.01); *H04L 27/2335* (2013.01)

(58) Field of Classification Search
CPC .................. H04L 27/2334; H04L 27/2335
USPC .......................................................... 375/324
See application file for complete search history.

(56) References Cited

U.S. PATENT DOCUMENTS

| 8,386,550 B1* | 2/2013 | Mauer ................... H03H 17/06 708/319 |
| 10,172,105 B2 | 1/2019 | de Ruijter et al. | |
| 2004/0012433 A1* | 1/2004 | Kim ................... H04L 25/03076 375/345 |
| 2005/0246404 A1* | 11/2005 | Aramaki ............... H03H 17/026 708/313 |
| 2017/0004597 A1* | 1/2017 | Boles ....................... G06T 1/005 |
| 2019/0312571 A1* | 10/2019 | Hovakimyan ...... H03M 1/0614 |

OTHER PUBLICATIONS

U.S. Appl. No. 18/060,117, filed Nov. 30, 2022, entitled "Apparatus and Method for Removing Noise From Frequency Signals," in the name of De Ruijter, Hendricus.

* cited by examiner

*Primary Examiner* — Tanmay K Shah
(74) *Attorney, Agent, or Firm* — Trop, Pruner & Hu, P.C.

(57) ABSTRACT

A cluster correlator may be configured with: a first stage comprising a set of first correlators to correlate samples of an input signal with a first predetermined pattern and output an output sample, the set of first correlators to output a sample cluster corresponding to the output sample of the set of first correlators during a switching cycle of the first stage; a filter coupled to an output of the first stage to receive the sample cluster and to produce a processed output sample based on the sample cluster; and a second stage comprising at least one second correlator to receive a processed output sample from the filter and correlate the processed output sample with a second predetermined pattern, and output one or more correlation outputs during a switching cycle of the second stage.

20 Claims, 9 Drawing Sheets

CLUSTER CORRELATOR FOR A DEMODULATOR

BACKGROUND

In wireless receivers, Correlators or Cost Function Engines (CFEs) are used to find timing of incoming packets. These components typically operate at relatively low signal-to-noise ratios and therefore have a window length that can be rather large. Hence, these components can undesirably dominate die area of a demodulator of the receiver.

SUMMARY OF THE INVENTION

In one aspect, an apparatus comprises: a first stage comprising a set of first correlators, each of the first correlators to receive cyclically distributed samples from an input signal during a switching cycle of the first stage, the first correlators to correlate samples of the input signal with a first predetermined pattern and output an output sample, the set of first correlators to output a sample cluster corresponding to the output sample of the set of first correlators during the switching cycle of the first stage; a filter coupled to an output of the first stage, the filter to receive the sample cluster and to produce a processed output sample based on the sample cluster; and a second stage comprising a set of second correlators, comprising at least one second correlator, each of the second correlators to receive a processed output sample from the filter and correlate the processed output sample with a second predetermined pattern, the set of second correlators to output correlation outputs during a switching cycle of the second stage.

In an implementation, the apparatus further comprises: a first multiplexer to receive the input signal and to cyclically provide samples of the input signal to the set of first correlators at a first switching rate; and a second multiplexer coupled to the filter, the second multiplexer to receive the processed output sample and to cyclically provide the processed output sample to the set of second correlators at a second switching rate.

In an implementation, the first multiplexer is to cyclically switch at a rate of Fs and the second multiplexer is to cyclically switch at a rate of Fs/k, where Fs is a sampling rate of the input signal and k is a number of the set of first correlators. The filter may be configured to produce the processed output sample of the sample cluster based at least in part on a number of positive output samples and a number of negative output samples from the set of first correlators.

In an implementation, the apparatus further comprises a timing detection circuit coupled to the second stage, the timing detection circuit to determine a timing of the input signal and to output a timing signal based on the timing determination. The apparatus may further comprise a memory to store incoming samples of the input signal, where the memory comprises a memory controller to control output of the incoming samples based at least in part on the timing signal. After the timing detection, the first stage is to receive the incoming samples of the input signal from the memory to track timing.

In an implementation: the set of first correlators are configured with a first length, the first length equal to Lp/k, where Lp is a length, expressed in samples, of a repeated pattern in a header of a packet and k is a number of the set of first correlators; and the set of second correlators are configured with a second length, the second length equal to Lw/Lp, where Lw is a detection window length expressed in samples.

In another aspect, a method comprises: correlating, in a plurality of first correlators of a first stage of a correlator circuit, a plurality of samples of an input signal comprising a packet, at an oversampling rate, and providing a sample cluster from the plurality of first correlators to a filter; producing, via the filter, a processed sample, based on the sample cluster and providing the processed sample to a second stage of the correlator circuit; correlating, in a set of second correlators of the second stage of the correlator circuit, the set of second correlators comprising one or more second correlators, the processed sample of a plurality of sample clusters, and outputting a correlation output from the set of second correlators to a timing detection circuit; and determining, in the timing detection circuit, a timing of the packet based at least in part on the correlation output from the set of second correlators.

In an implementation, the method further comprises receiving the input signal in a first input multiplexer and cyclically providing a sample of the input signal to each of the plurality of first correlators during a switching cycle of the first stage. The method may also include: providing the samples to the plurality of first correlators at an oversampling rate; and providing the processed sample to the set of second correlators at a downsampling rate.

In an implementation, performing the timing detection comprises performing a coarse timing and performing a fine timing. The coarse timing may include: when a current correlation output from the set of second correlators exceeds a detection threshold, identifying a highest correlation output of the set of second correlators; and identifying, of the set of second correlators, a previous correlation output and a next correlation output adjacent to the current correlator output. Performing the fine timing may include: selecting a sample phase for the fine timing detection, based at least in part on a comparison of the current correlation output, the previous correlation output and the next correlation output.

In an implementation, producing the processed sample comprises selecting a sample of the sample cluster having a highest absolute value when there are equal numbers of positive and negative samples of the sample cluster. Selecting the one sample of the sample cluster comprises: selecting a highest positive sample when a number of positive samples of the sample cluster exceeds a number of negative samples of the sample cluster; and selecting a highest negative sample when a number of negative samples of the sample cluster exceeds a number of positive samples of the sample cluster. Selecting the sample phase for the fine timing detection may be based on selecting a second highest correlation output from the previous and next correlation outputs, and a comparison of the current correlation output to a sum of the second highest correlation output and a phase detection threshold.

In another aspect, a system comprises: a receiver to receive a radio frequency (RF) signal, the receiver comprising a RF front end circuit to process the RF signal into a lower frequency signal, a baseband processor coupled to the RF front end circuit, and a demodulator. The baseband processor may include: a COordinate Rotation Digital Computer (CORDIC) engine to transform the lower frequency signal to a phase signal; a differential circuit coupled to the CORDIC engine, the differential circuit to differentiate the phase signal; a memory coupled to the differential circuit to store samples of the phase signal; and a correlation circuit coupled to the differential circuit to receive the samples of the phase signal. The correlation circuit may include: a plurality of first correlators to correlate the samples of the phase signal with a first predetermined pattern and output, during a first switching cycle, a sample cluster comprising an output sample from each of the plurality of first correlators; a filter coupled to the plurality of first correlators, the filter to receive the sample cluster and to produce a processed output sample of the sample cluster; and at least one second correlator coupled to the filter, wherein during the first switching cycle one of the at least one second correlator is to receive a selected output sample from the filter and correlate the selected output sample with a second predetermined pattern, and output a correlation output. The demodulator may be coupled to the memory to demodulate the samples of the phase signal into a demodulated signal.

In an implementation, the system further comprises a timing detection circuit coupled to the at least one second correlator, the timing detection circuit to determine a timing of a packet included in the RF signal based on the correlation output and to provide a timing signal to the memory based on the timing determination. The plurality of first correlators may be configured with a first length, the first length equal to Lp/k, where Lp is a length of a repeated pattern in a header of a packet and k is a number of the plurality of first correlators. The at least one second correlator may be configured with a second length, the second length equal to Lw/Lp, where Lw is a detection window length.

DETAILED DESCRIPTION

In various embodiments, a receiver includes a correlator architecture that is provided to perform correlations in processing incoming signals. This correlator architecture may provide substantial die area reduction benefits, owing to its pipelined architecture. In addition, this correlator architecture, as implemented in a smaller footprint, also provides power consumption savings as compared to a conventional correlator. Before details of the correlator are set forth, a discussion of general correlator design and operation is presented.

A synchronization header (SHR) in wireless communication systems usually includes several modulated patterns. For example, in Wireless Smart Ubiquitous Network (WiSUN) the frequency shift keying (FSK) PHY may use an FSK modulated preamble pattern of "01", repeated 32 times and Zigbee may use an orthogonal quadrature phase shift keying (O-QPSK) modulated pattern of 32-chips, repeated 8 times. The receiver may use the SHR to find timing, i.e., finding symbol boundaries, so that symbols in the packet can be demodulated.

Typically a receiver includes a correlator or cost function engine (CFE) to detect timing. A correlator may run a cross-correlation between the received signal and an expected pattern or may run an autocorrelation between the received signal and a delayed received signal. Timing detection is performed by searching for a correlation peak in the correlator output signal. When a cost function engine is used, timing is found by searching for a dip in the CFE output signal.

While embodiments are described in the context of correlators, understand that a similarly configured CFE instead may be used. In operation, a correlator may operate at an oversampling rate (OSR), which means that multiple samples per symbol are used. This makes it possible to correlate multiple phases of the received signal with the expected SHR sequence. By correlating multiple phases, the receiver may be able to select a phase that is closest to the received symbol boundary to detect timing.

For low signal levels, the signal to noise ratio may be insufficient to correctly detect timing. Detection performance can be improved by increasing correlator length, which may typically span several modulated patterns. A given correlator segment is replicated for every detection phase, e.g., when the OSR is 5 then 5 segments are present to receive samples. Without an embodiment, die area (DA) is proportional to: $DA \propto OSR \cdot L \cdot D$, where L is the length of the correlator and D is the data-path width (the number of bits used to process incoming samples). Without an embodiment, a correlator can undesirably dominate die area of a demodulator.

Since die area is proportional to the OSR, embodiments may reduce the OSR in at least a part of a correlator. To this end, a correlator may be configured into 3 pipeline stages. A first stage correlator may be configured to operate at a full or OSR rate (e.g., the same OSR as a conventional correlator). Further details of this first stage are described below. The first stage correlator is followed by a cluster filter. After every first stage cycle, the cluster filter derives one output sample from a sample cluster provided by the first stage. This reduces the sample rate at the output of the cluster filter by 1/OSR times. Several algorithms are possible to implement the cluster filter, as will be described below. In turn, a second stage correlator takes samples from the cluster filter output. Hence the OSR in the second stage correlator is now reduced by the cluster size. Since the OSR is now reduced, die area is saved in the correlator succeeding the cluster filter.

The following use case parameters may be considered in designing a cluster correlator. OSR is the number of samples per chip. If there is no spreading, then OSR is the number of samples per symbol. The parameter Lp is the length of one of the repeating modulated patterns in a preamble (in samples). Note that in the context of a cluster correlator, an inverted modulation pattern can also be considered a part of the repeating modulation pattern, e.g., the inverted Manchester symbols in an access address (AA) of a Bluetooth Low Energy (BLE) coded PHY. The parameter Lw is a detection window length, and is calculated as follows: Lw=N·Lp (in samples), where N is the number of Lp repetitions to be included in the correlation (window).

With respect to the first stage correlator, k is a number of segments (i.e., independent correlators), this term also represents the size of the sample cluster, i.e., the number of samples in a cluster. A correlator length is defined as La, and is the number of coefficients used in the correlators of the first stage.

With respect to the second stage correlator, I is a number of segments (i.e., independent correlators). A correlator length is defined as Lb, and is the number of coefficients used in the correlators of the second stage.

With these parameters, k also equals the cluster size and is the OSR. In turn, the first stage correlator length La=Lp/k. In turn, I equals the number of clusters per symbol, and I=Lp/k, and the second stage correlator length Lb=Lw/Lp.

With particular consideration of configuration of a cluster correlator for an example of IEEE 802.15.4 O-QPSK 2.4 GHz PHY, the following use case parameters apply, where in a preamble, 8 symbols of "0" are used to synchronize the receiver. In this example, OSR is the number of samples per chip, here assumed to be OSR=4. The length of one of the repeating modulated preamble patterns, Lp, is the number of samples per symbol of 32 chips: Lp=32×4=128. With the detection window length: Lw=N·Lp (in samples), assuming N=4, the correlation length is 4 symbols, and thus Lw=512 samples. With these assumptions, the number of segments is 4, and the correlators of the first stage have a correlator length La=Lp/k=32. The 32 coefficients match the expected pattern of one repeating pattern, in this case a symbol, and may be represented by a single bit (e.g., 1 representing a coefficient of +1 and 0 representing a coefficient of −1) or multi-bit representing signed coefficient values.

For the correlators of the second stage, the number of segments I=La=32, and the correlator length: Lb=Lw/Lp=4. Since all preamble symbols are the same, the coefficients are all set to "1." With these figures, a cluster area in accordance with an embodiment may be reduced by approximately 50% as compared to a conventional correlator, as a cluster correlator area $\propto (k \cdot La + I \cdot Lb)$.

With particular consideration of configuration of a cluster correlator for an example of a BLE coded PHY, the following use case parameters apply where an Access Address (AA) is used to find timing, in 64 Manchester symbols. In this example, OSR is the number of samples per chip, assumed to be 4, so k=4. The length of one of the repeating modulated preamble patterns: Lp (in samples) is a Manchester symbol having 4 chips with 4 samples/chip, and thus Lp=16 with the detection window length: Lw=N·Lp (in samples), assuming N=64. The correlation length is 64 symbols, and thus Lw=1024 samples.

With k=4, the number of segments in the first stage correlator is 4, and the correlators of the first stage have a correlator length La=4. For the correlators of the second stage, the number of segments I=La=Lp/k=4 and the correlator length is Lb=Lw/Lp=64. With these figures, a cluster correlator in accordance with an embodiment may reduce the die area by approximately 73% as compared to a conventional correlator, as a cluster correlator area $\propto (k \cdot La + I \cdot Lb)$.

With particular consideration of configuration of a cluster correlator for an example of a BLE uncoded PHY, the following use case parameters apply where an AA is used to find timing, in 32 symbols equaling 32 chips. In this example, OSR is the number of samples per symbol, assumed to be 4. The repeating pattern is one symbol having 4 samples, so Lp=4. The detection window length: Lw=N·Lp (in samples), assuming N=32 the correlation length is 32 symbols, and thus Lw=128 samples.

With these assumptions, the number of segments is k=4, and the correlators of the first stage have a correlator length La=1 (and thus no FIR correlator is needed). The samples from the input may be directly passed on to the cluster filter without any pre-processing and the cluster filter may select the most likely sample from the cluster (4 consecutive samples of the input signal per switching cycle). There is a single correlator of the second stage, having a correlator length of Lb=Lw/Lp=32. With these figures, a cluster area in accordance with an embodiment may be reduced by approximately 72% as compared to a conventional correlator, as a cluster correlator area $\propto (k \cdot La + I \cdot Lb)$.

Figure 1:
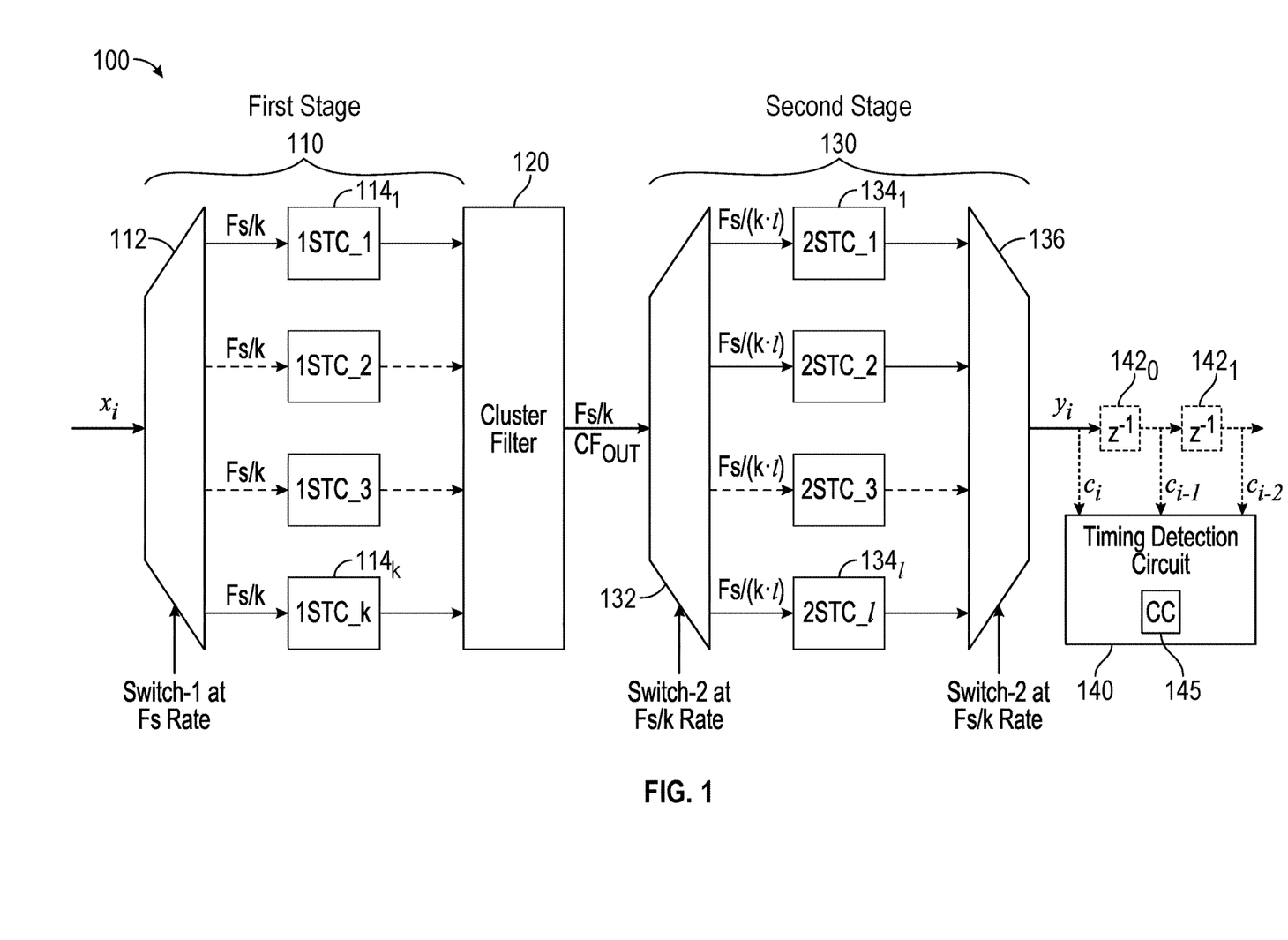
FIG. 1 is a block diagram of a cluster correlator in accordance with an embodiment.

Referring now to FIG. 1, shown is a block diagram of a cluster correlator in accordance with an embodiment. As shown in FIG. 1, a cluster correlator 100 includes multiple stages of correlators separated by a cluster filter. As shown, cluster correlator 100 includes a first stage 110 having a plurality of first correlators $114_{1-k}$. As shown, each first correlator 114 is configured to receive an incoming sample of an input signal xi via an input multiplexer 112. In embodiments, multiplexer 112 may be configured to cyclically provide input samples to first correlators 114 at a switching rate of Fs, where Fs is the sample rate of input signal xi. As such, during a switching cycle of the first stage, each first correlator 114 receives one sample (at a rate of Fs/k). Although embodiments are not limited in this regard, in one implementation, there are 4 first correlators 114 when k equals 4.

First correlators 114 may be configured to have a given length and operate to perform a correlation between incoming samples and a predetermined pattern and output a correlation result, referred to herein as an "output sample." In embodiments, the first stage correlators are configured to operate at an oversampling rate (OSR) or full rate. Typically, the OSR is chosen high enough to limit implementation loss to about less than 0.5 dB, i.e., the detection sensitivity is less than 0.5 dB compared to a very high OSR. Preferably the length of first correlators 114 is selected to be as small as possible, as these correlators operate at full sample rate. In embodiments, first correlators 114 may be configured to have a length of one of the repeating modulated patterns, which could be a symbol.

In operation, input multiplexer 112 provides incoming samples that are distributed in a cyclic fashion. For example, input multiplexer 112 feeds sample_1 to first correlator $114_1$, feeds sample_2 to first correlator $114_2$, etc., until OSR samples are provided, after which the switching cycle repeats.

As used herein, the output samples output from first correlators 114 are called, collectively, a "sample cluster" or "cluster." Every first stage switching cycle, OSR samples are fed to first correlators 114 and the cluster (OSR samples) is refreshed.

Thus these output samples form a sample cluster, which is provided to a cluster filter 120. Details of operation of cluster filter 120 are described further below. At a high level, cluster filter 120 is configured to output a single sample from the sample cluster according to a given algorithm. In essence therefore, cluster filter 120 performs a downsampling function to output a filtered output ($CF_{out}$) at a downsampling rate of Fs/k.

Still with reference to FIG. 1, this cluster filter output is provided to a second stage 130. As shown, second stage 130 includes a plurality of second correlators $134_{1-I}$. Another input multiplexer 132 receives the channel filter output and cyclically switch at a rate of Fs/k, so that each second correlator 134 receives samples at a rate of Fs/(k·I). Each of the set of second correlators receives a sample within a switching cycle of the second stage.

In turn, the correlator outputs from second correlators 134 are provided to an output demultiplexer 136, which also switches at a rate of Fs/k. The resulting cluster correlator output ($y_i$) in turn is provided to a timing detection circuit 140 which may be configured to determine both coarse and fine timings for the input signal. To this end, timing detection circuit 140 includes a control circuit 145 which may perform these various steps of timing detection, details of which are further discussed below. As shown, timing detection circuit 140 couples to a digital filter, implemented as a second order filter (having filter taps $142_{0-1}$). Understand that the timing determination realized in timing detection circuit 140 may be used to control output of samples of the incoming signal from a memory to a demodulator signal processing path. Although shown at this high level in the embodiment of FIG. 1, understand that many variations and alternatives are possible.

Figure 2A:
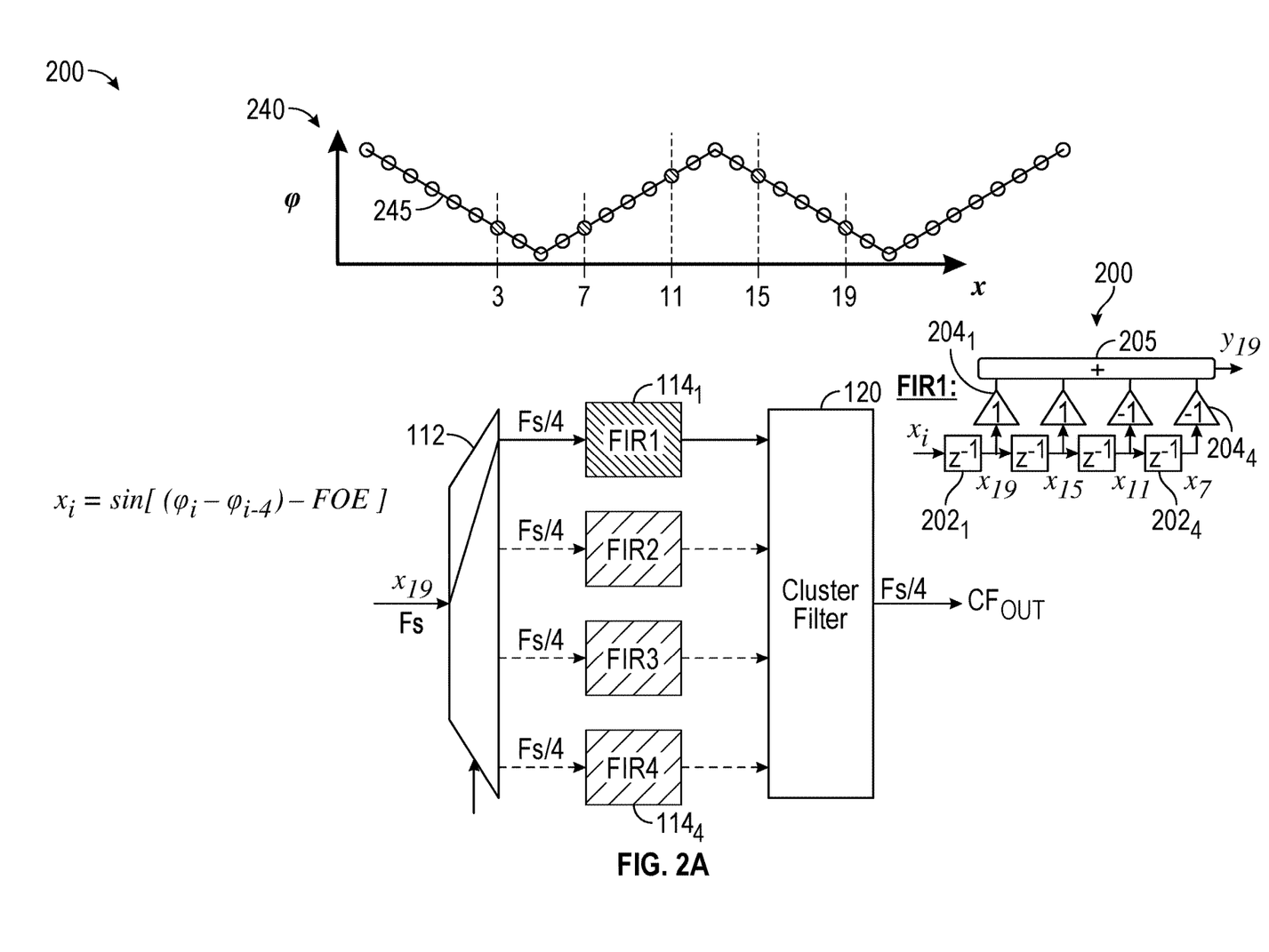
FIG. 2A is an illustration of operation of a first stage of a cluster correlator in accordance with an embodiment.

Referring now to FIG. 2A, shown is an illustration of operation of a first stage of a cluster correlator in accordance with an embodiment. FIG. 2A illustrates operation of the cluster correlator during an acquisition mode in performing cluster filter decimation of an input signal 245, shown in graphical illustration 240. Note that the components of a cluster correlator are represented with the same reference numerals as in FIG. 1. As shown, an incoming signal xi is input via multiplexer 112 cyclically to first correlators 114. With reference to FIG. 2A, operation of the cluster correlator is described with respect to first correlator $114_1$, which receives every fourth sample corresponding to a given phase. Thus first correlator $114_1$ receives samples $x_3$, $x_7$, $x_{11}$, $x_{15}$ and $x_{19}$, where it receives each sample during a given first stage switching cycle of input multiplexer 112.

FIG. 2A further shows a block diagram of an implementation of a first stage correlator in accordance with an embodiment that may be used to detect a BLE coded signal. As shown, correlator 200 is implemented as a finite impulse response (FIR) filter configuration having filter elements $202_1$-$202_4$. As shown, filter elements 202 couple to together serially, such that the input samples pass through the signal processing path and are further provided to a set of gain components $204_{1-4}$. As illustrated, each gain component 204 may be implemented with a unitary gain (with positive gain coefficients of 1 for gain components $204_{1-2}$ and negative coefficients of −1 for gain components $204_{3-4}$). This configuration may be used to detect Manchester coded symbols as used in the BLE coded PHY. In turn, the resulting values are summed in a summer 205 and output as a correlator output sample. As shown, the correlator output sample ($y_{19}$, for input signal $x_{19}$) is provided to cluster filter 120. During a first stage switching cycle, cluster filter 120 receives a given output sample from each of first correlators 114. Note that operation proceeds similarly for each of the other correlators of the first stage. For example, correlator 1142 is configured to receive samples of a different phase, e.g., samples $x_4$, $x_5$, $x_{12}$, $x_{16}$, and $x_{20}$.

Figure 2B:
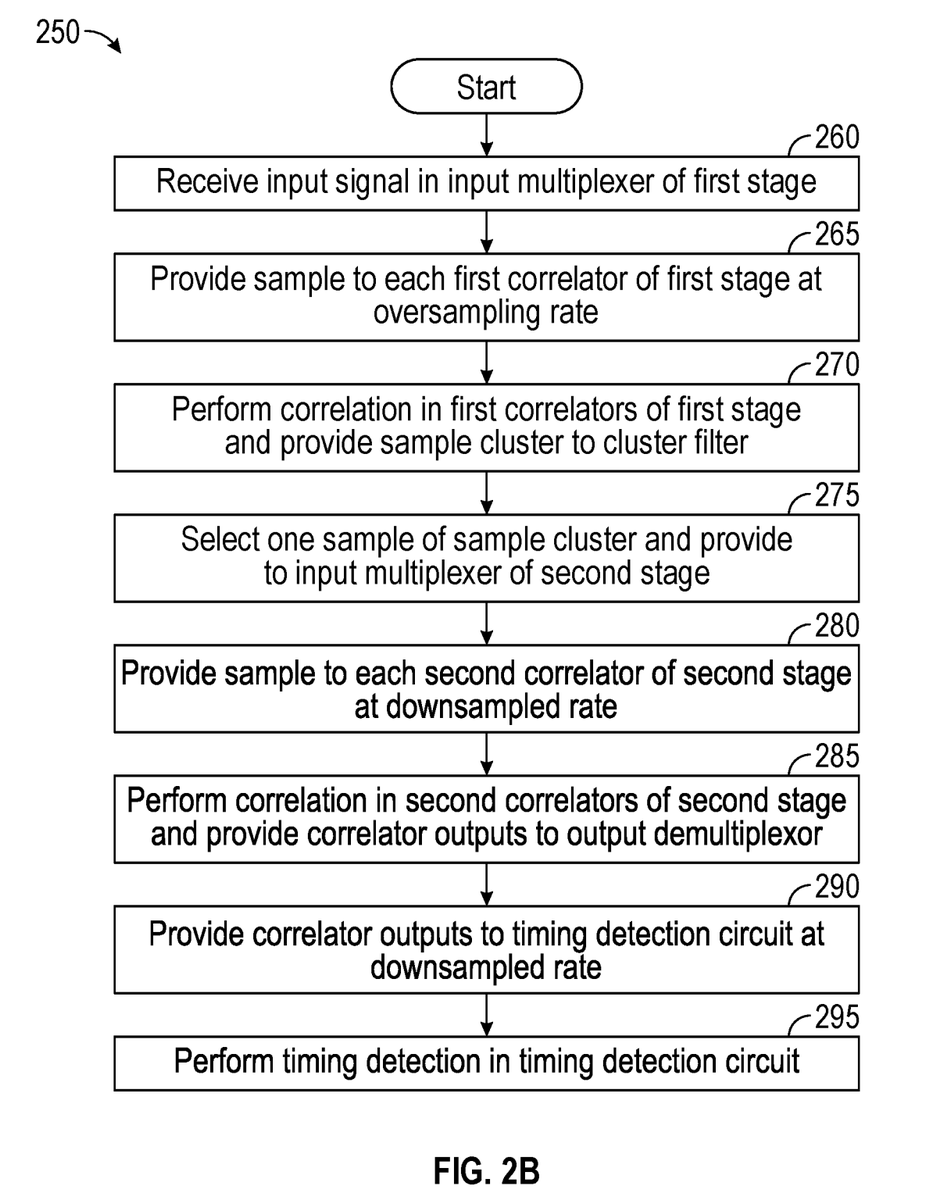
FIG. 2B is a flow diagram of a method in accordance with an embodiment.

Referring now to FIG. 2B, shown is a flow diagram of a method in accordance with an embodiment. More specifically, method 250 is a method for operating a cluster correlator such as that of FIG. 1. As such, method 250 may be performed by hardware circuitry of the cluster correlator along with possibly firmware and/or software.

As illustrated, method 250 begins by receiving an input signal in an input multiplexer of a first stage of the cluster correlator (block 260). Understand that this input signal is formed of a digital oversampled bitstream representing a received RF signal (which includes a packet of a given modulation scheme). At block 265, during a switching cycle of the input multiplexer of the first stage, a sample is provided to each first correlator of the first stage at an oversampling rate. Next at block 270, the first correlators perform a correlation, namely a mathematical operation (a cross-correlation) between the samples in the correlator and a predetermined pattern, e.g., an expected pattern such as a symbol or a portion of a preamble and/or synchronization header. The resulting output sample, namely the correlation result, is provided to a cluster filter of the cluster correlator. Thus, during the switching cycle, a sample from each first correlator is output to the cluster filter. Collectively, the output samples from each first correlator, produced during a first stage switching cycle, form a sample cluster.

Still referring to FIG. 2B, next at block 275, the cluster filter operates to select one sample of the sample cluster and provide it to an input multiplexer of a second stage of the cluster correlator. One manner of cluster filter operation is discussed further below with regard to FIG. 3. Thereafter at block 280, the input multiplexer of the second stage provides a sample to each second correlator of the second stage. Note that this sample provision is performed at a downsampled rate. As such, multiple sample clusters are received in the cluster filter which in turn sends selected samples to the input multiplexer of the second stage, in order to provide a sample to each second correlator at the downsampled rate. Then at block 285, the second correlators perform a correlation between the samples in the second correlator and a second predetermined pattern, e.g., an expected pattern such as a synchronization pattern or a portion of the preamble or a combination thereof. The resulting correlator outputs, namely the correlation results, are provided to an output demultiplexer. Thus, during a single oversampling period, one correlator output is provided, and during a plurality of oversampling periods, a correlator output from each second correlator is output to the output demultiplexer.

Still with reference to FIG. 2B, next at block 290, the correlator outputs from the second stage correlators are provided through the demultiplexer at the downsampled rate. These correlator outputs are provided to a timing detection circuit. Then at block 295, the timing detection circuit may, based at least in part on the correlator outputs, determine coarse and fine timing for the incoming packet. Although shown at this high level in the embodiment of FIG. 2B, many variations and alternatives are possible.

As discussed above, within a first stage switching cycle a cluster filter is configured to receive correlator output samples from each of the first correlators, referred to as a sample cluster. From this sample cluster, the cluster filter is configured to select one sample for output to a second stage of correlators, thus performing a downsampling function.

Figure 3:
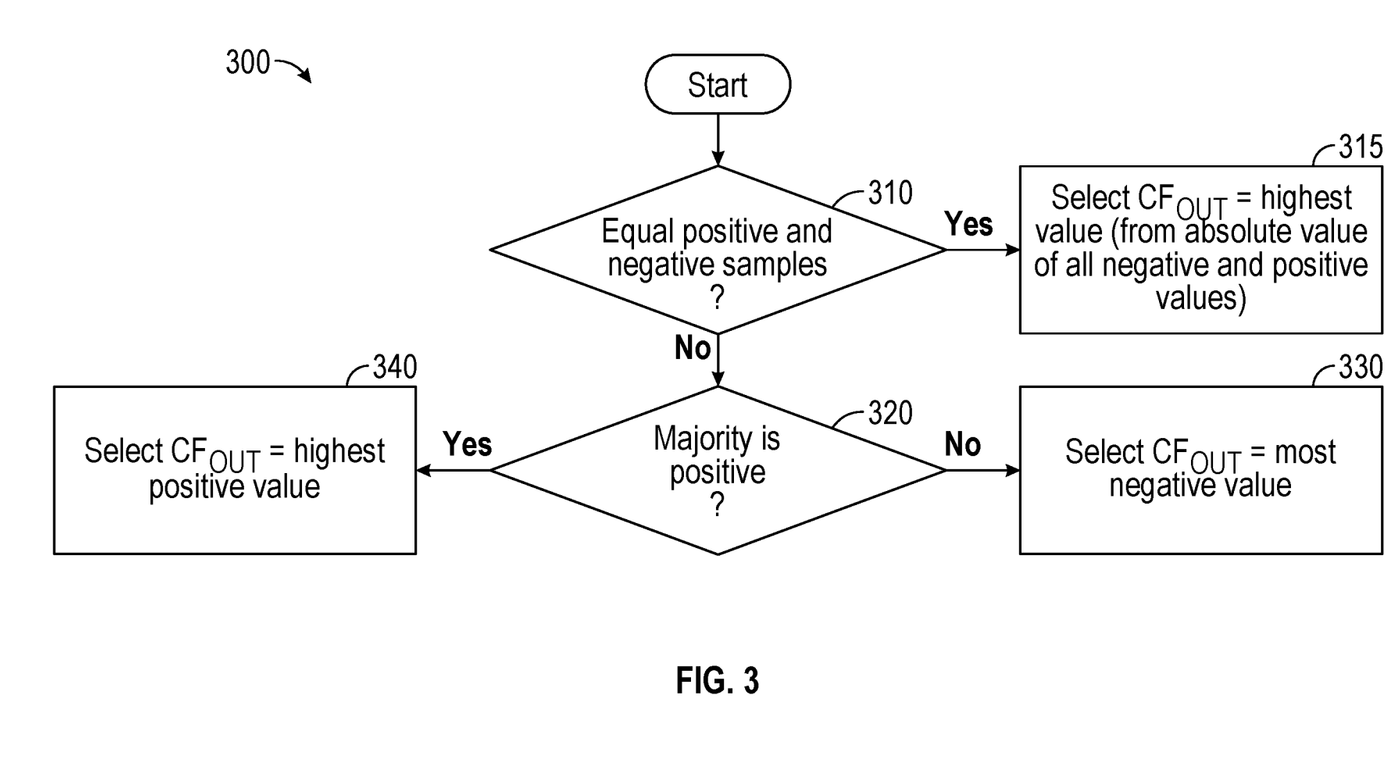
FIG. 3 is a flow diagram of a method in accordance with another embodiment.

Referring now to FIG. 3, shown is a flow diagram of a method in accordance with an embodiment. As shown in FIG. 3, method 300 is a method for performing a cluster filter technique in accordance with an embodiment. As such, method 300 may be performed by hardware circuitry of the cluster filter alone and/or in combination of firmware and/or software. Instructions of such firmware/software may be stored in one or more non-transitory storage media.

As illustrated in FIG. 3, method 300 begins by determining whether the number of positive and negative samples received within a sample cluster are equal (diamond 310). If so, control passes to block 315. At block 315, one sample is selected from the sample cluster, based on the highest absolute values in the sample cluster. The sample associated with the highest absolute value in the sample cluster is output as the cluster filter output (to be provided to the second correlator stage).

Still referring to FIG. 3, otherwise if there are not equal numbers of positive and negative samples, control passes to diamond 320 to determine whether the majority of samples is positive. If not, at block 330, the most negative value is output as the cluster filter output. Instead when it is determined that the majority of the samples is positive, control passes to block 340, where the highest positive value is output as the cluster filter output.

To explain the cluster filter operation as illustrated in FIG. 3, consider the following examples: (1) with correlator output samples of FIR1=−0.7, FIR2=−0.2, FIR3=0.5, FIR4=0.4, the cluster filter selects the result from FIR1 (=−0.7); and (2) with correlator output samples of FIR1=−0.7, FIR2=0.3, FIR3=0.6, FIR4=0.2, the cluster filter selects the result from FIR3 (=0.6). Understand although shown at this high level in the embodiment of FIG. 3, many cluster filter method variations and alternatives are possible. E.g., an alternative method could be that, regardless of the number of positive and negative samples in the cluster, the cluster filter could simply select the sample associated with the highest absolute value in the sample cluster. Alternatively, the cluster filter could process the sample cluster to generate an output, e.g., it could sum all samples of the cluster; or sum only two samples that have the highest absolute values, etc.

Figure 4:
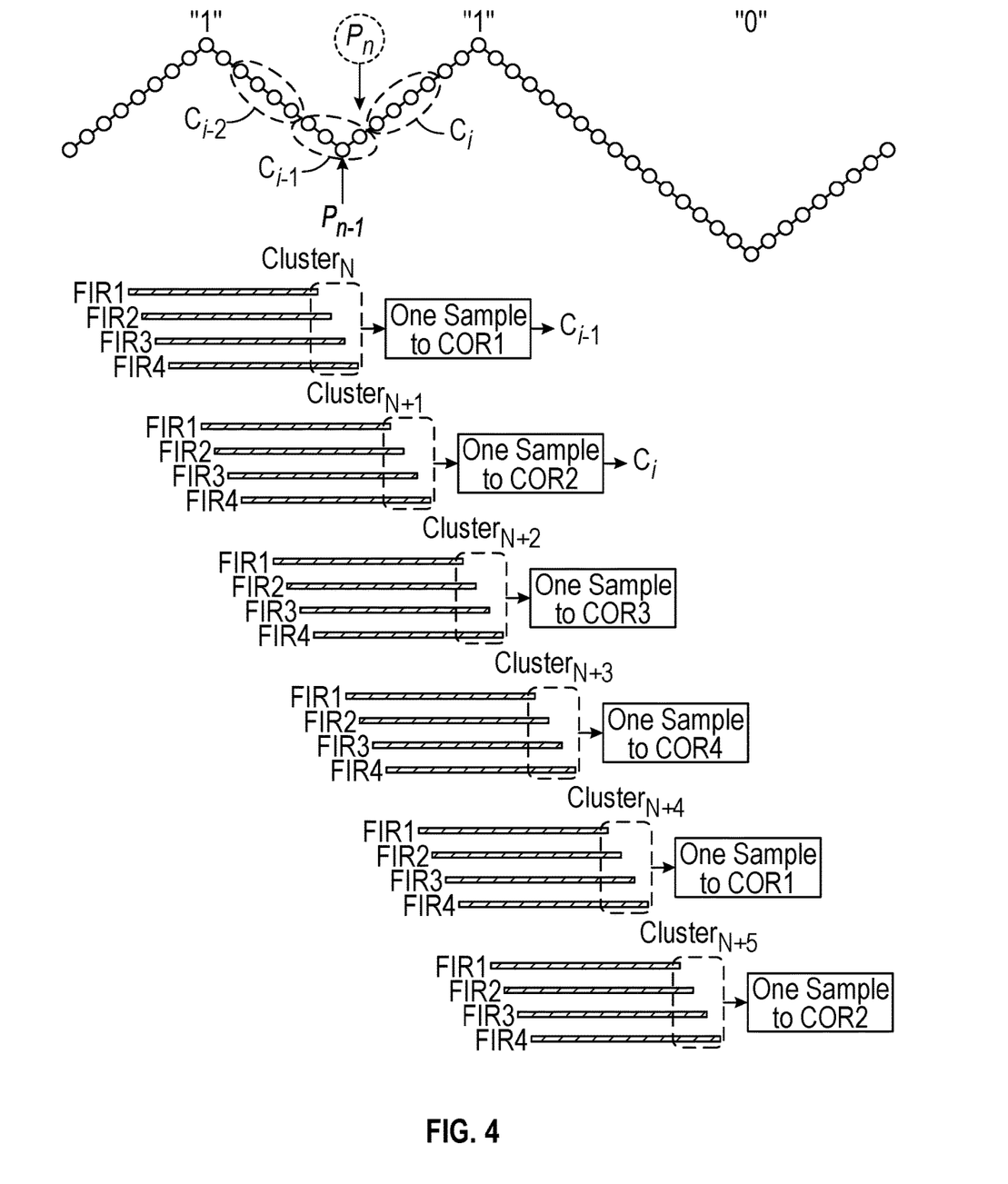
FIG. 4 is an illustration of timing detection in accordance with an embodiment.

Referring now to FIG. 4, shown is an illustration of timing detection in accordance with an embodiment. In FIG. 4, an incoming sample stream 410 is shown in timing diagram 400. Note that these incoming samples may be stored into a memory such as a RAM. This RAM may be read by downstream circuitry, namely, a demodulator signal processing path based on the timing detection performed.

As further illustrated in FIG. 4, for each cluster one sample is provided to a second correlator of the second correlator stage. With reference to FIG. 4, assume presence of four first stage correlators and four second stage correlators. For each cluster (corresponding to a switching cycle of the input multiplexer and the cluster filter), the cluster filter selects one sample and provides it to the second correlator stage. Thus in this example, each cluster has four sample phases $P_{n-3}$, $P_{n-2}$, $P_{n-1}$ and $P_n$.

During coarse timing detection a search is performed on correlator output samples (output from the second stage) to identify the cluster (e.g., of N clusters) that has the highest correlation value and its adjacent clusters.

More specifically, during this coarse timing search, the following analyses are performed: check if $C_{i-1}$ exceeds a detection threshold; if $C_{i-1}$ exceeds the detection threshold, then search for a higher value of $C_{i-1}$ for N more clusters; track the highest correlation value by storing $C_i$ $C_{i-1}$ and $C_{i-2}$ and overwriting these values whenever a new higher $C_{i-1}$ value is found; after N more clusters are evaluated, the cluster with the highest correlation value ($C_{i-1}$) and its adjacent clusters ($C_i$ and $C_{i-2}$) are stored and used for the fine timing detection algorithm.

Thus, based upon the results of the coarse timing detection, a fine timing estimation is performed as shown in FIG. 4. Adjacent cluster correlation values are used to find an optimal sample phase. More specifically, the clusters with the highest and second to highest correlations (of N clusters) are used to determine a sample phase that may be used for further packet detection (e.g., AA detection BLE), described further below. In this fine timing analyses, a down selection is thus performed to obtain accurate timing detection. For example, assume COR1 provides the highest correlation value ($C_{i-1}$) and COR2 provides the second to highest correlation value ($C_i$). Fine timing detection may be obtained by comparing the highest correlation to the sum of the second to highest correlation and a phase detection threshold (K). For example, when cluster $c_i$ has the second to highest correlation: IF $C_{i-1}>(C_i+K)$, sample n−1 is selected; else sample n is selected. When cluster $C_{i-2}$ has the second to highest correlation: IF the highest_cor> (the second_to_highest_cor+K), sample n−2 is selected; else sample n−3 is selected. In an embodiment, the phase detection threshold K=0.05×Max_correlation. In other embodiments, K can empirically be optimized.

Figure 5:
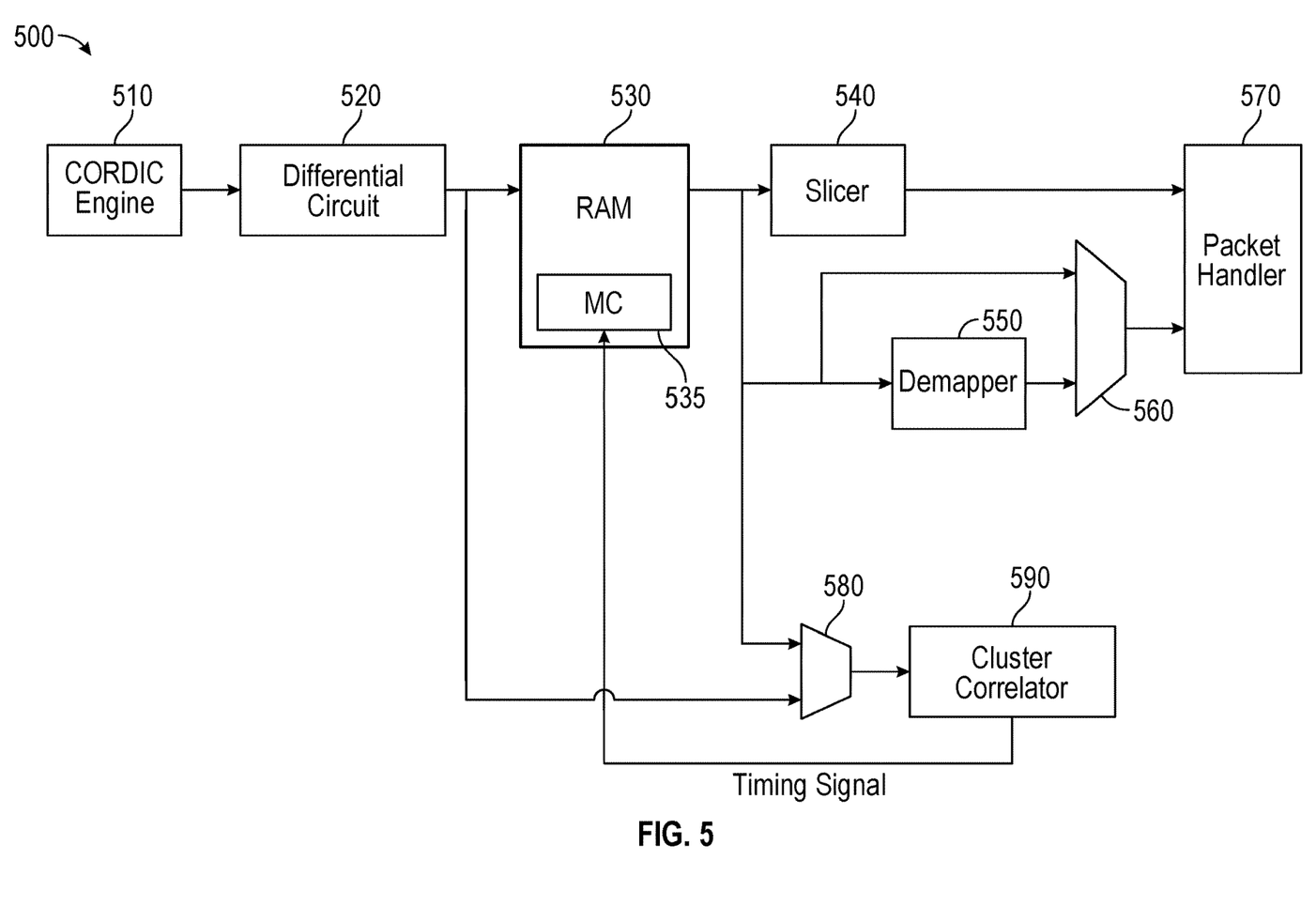
FIG. 5 is a block diagram of a demodulator in accordance with an embodiment.

Referring now to FIG. 5, shown is a block diagram of a demodulator in accordance with an embodiment. More specifically as shown in FIG. 5, demodulator 500 is a representative demodulator that may be used to demodulate incoming communications, e.g., BLE-based communications. Demodulator 500 includes a multi-stage correlator in accordance with an embodiment. More specifically, cluster correlator 590 may be implemented as shown above in FIG. 1. As such, cluster correlator 590 performs correlations as described herein in a multi-stage manner and along with an associated timing detector, determines coarse and fine timings.

Based upon the fine timing determined, cluster correlator 590 sends a timing signal to a memory 530 (e.g., a RAM). More specifically, the timing signal is sent to a memory controller 535. Based at least in part on this timing signal, which may indicate an appropriate phase, memory controller 535 causes stored samples beginning at a particular index to be sent to additional demodulator circuitry.

With reference to the demodulator signal processing path of demodulator 500, incoming samples are provided to a COordinate Rotation DIgital Computer (CORDIC) engine 510, which transforms the incoming baseband signal from a cartesian representation to a phase representation, and outputs phase signals to a differential circuit 520 that is configured to obtain a frequency signal by differentiating the phase. As shown these frequency samples are provided both to memory 530 and, via an input multiplexer 580, to cluster correlator 590. In embodiments, input multiplexer 580 may be controlled such that during timing detection, real time samples output from differential circuit 520 are provided to cluster correlator 590. After timing is acquired, cluster correlator 590 may operate in a tracking mode in which input multiplexer 580 provides stored samples from memory 530 to cluster correlator 590.

As further shown, stored samples from memory 530 are provided to a slicer 540 and a demapper circuit 550. Slicer 540 may be configured to make slicing decisions based upon the samples (with comparison to a slicer threshold value) and send slicer bit decisions to a packet handler 570. In turn, demapper circuit 550 may perform demapping operations for coded symbols. Then depending upon whether such demapping is active or not, a multiplexer 560 sends the demapped or stored samples directly from memory 530 to packet handler 570. The demapper may be used to translate Manchester coded symbols into decoded values, e.g., to decode the BLE coded PHY at 125 kbps. The slicer may be used if there is no coding, e.g., to decode the BLE coded PHY at 500 kbps. Understand while shown at this high level in the embodiment of FIG. 5, many variations and alternatives are possible.

Figure 6:
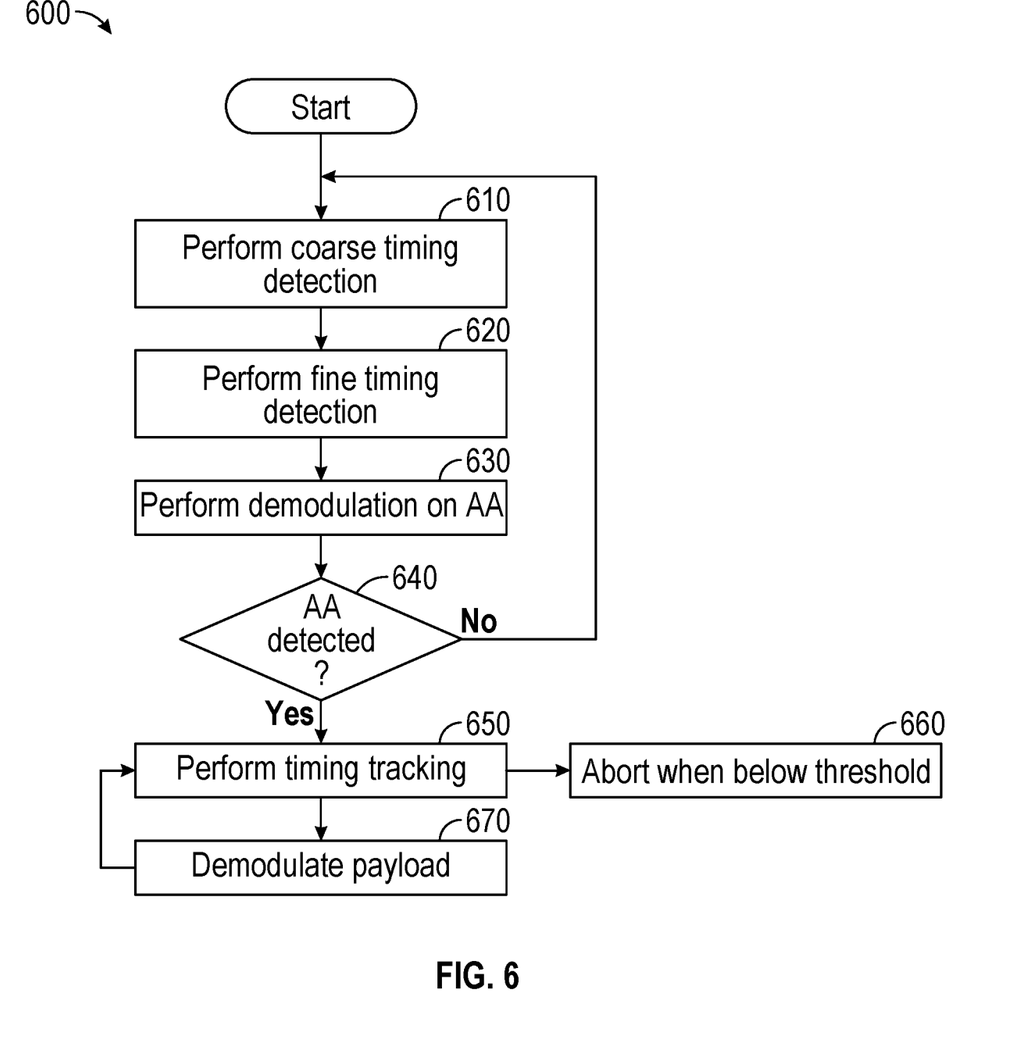
FIG. 6 a flow diagram of a method in accordance with another embodiment.

Referring now to FIG. 6, shown is a flow diagram of a method in accordance with another embodiment. As shown in FIG. 6, method 600 is a method for operating a receiver having a cluster correlator in accordance with an embodiment. As such, method 600 may be performed by hardware circuitry of the receiver along with possibly firmware and/or software.

As illustrated, method 600 begins by performing a coarse timing detection (block 610). In embodiments, this coarse timing detection may be performed as discussed above, using a cluster correlator in accordance with an embodiment, along with its associated timing detector circuitry. Thereafter, at block 620, a fine timing detection is performed, to identify from adjacent cluster correlation values an optimal sample phase. Note that the timing detections performed may be executed in real time using incoming samples prior to their storage in a memory. In an embodiment, the correlators are not used during fine timing adjustment so they can be kept active after coarse detection, which helps to recover from a false coarse detection.

Next upon successful coarse and fine timing, control passes to block 630 where demodulation is performed to obtain a binary access address or other packet information, like for example, a preamble, sync word or a combination thereof. In an AA operation, the binary value of the received AA is obtained by demodulation and forward error correction (FEC) processing. Note that this demodulation process, which may be performed by slicer 540 and a Viterbi decoder (e.g., as part of packet handler 570), may be implemented using stored samples output from the memory based on the timing detection of blocks 610 and 620.

Still with reference to FIG. 6, next at diamond 640, it is determined whether the appropriate access address has been detected by comparing the binary value of the received AA, as generated at block 630, to an expected value. When there is a match, block 640 will declare "Yes", i.e., AA is detected. Conversely, when there is no match at block 630 "No" is declared, i.e., AA is not detected. Alternatively, a "Yes" could be declared when the difference between the binary value of the received AA and the binary value of the expected AA is a limited number of bits, e.g., one or two bit errors may be tolerated and would still result in a "Yes". If the AA is detected, control passes to block 650, and if not, control passes back to block 610 for further coarse timing detection. In an embodiment, this binary AA detection is performed using AA differentiated phases from memory through demodulation and FEC decoding. A binary check is performed with the expected AA. When this check fails, the correlators are kept active, to keep loading new differentiated samples. When binary AA detection passes, operation proceeds to timing tracking.

At block 650, the correlator is reconfigured to enter a timing tracking mode in which the cluster correlator receives stored samples from the memory. During such timing tracking, an abort process may occur (at block 660) if correlation results drop below a threshold. In an embodiment, when all of the evaluated tracking phases produce correlation values that do not pass the tracking threshold, then there are three possibilities: the current timing is maintained and demodulation continues; or the timing is adapted to the phase associated with the highest correlation result and demodulation continues; or packet reception is aborted. In an embodiment, these possibilities may be programmable. Finally at block 670, a payload is demodulated by a demodulator, which reads samples from the memory based upon the timing determined within the timing detector circuitry associated with the cluster correlator. After a portion of the payload is demodulated, control repeats block 650 so that tracking is maintained across the payload. Although shown at this high level in the embodiment of FIG. 6, many variations and alternatives are possible.

Figure 7:
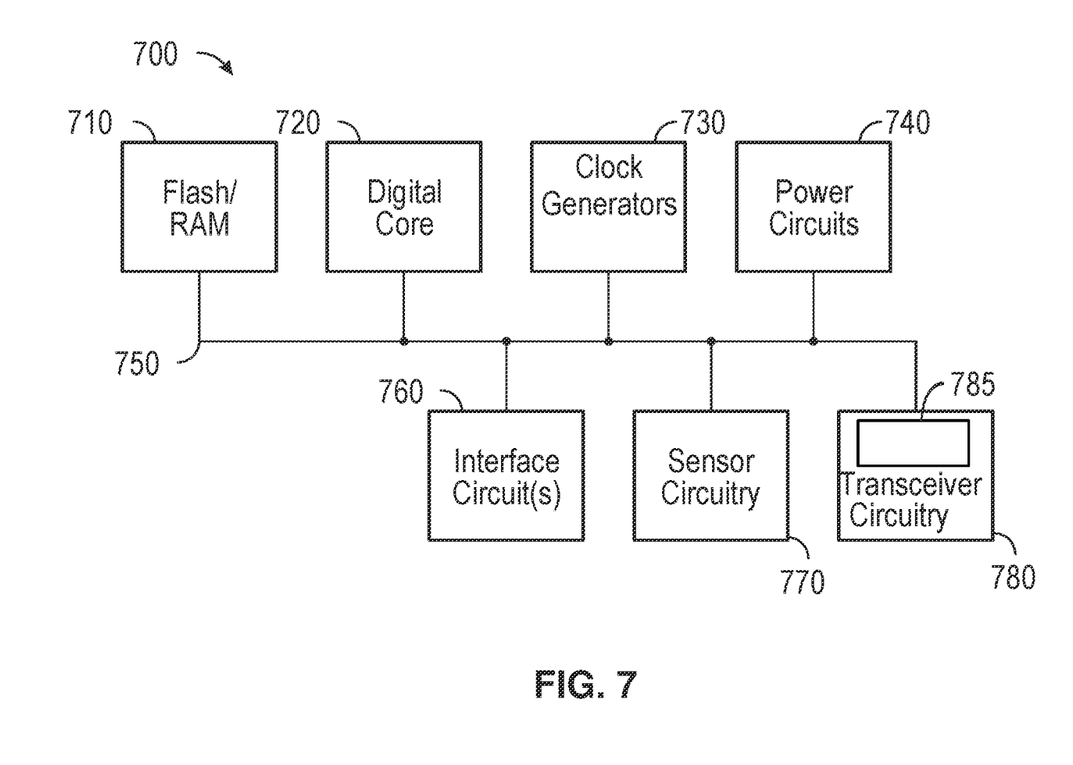
FIG. 7 is a block diagram of a representative integrated circuit in accordance with an embodiment.

Embodiments can be implemented in many different environments. Referring now to FIG. 7, shown is a block diagram of a representative integrated circuit 700 that can be configured with a cluster correlator as described herein. In the embodiment shown in FIG. 7, integrated circuit 700 may be, e.g., a microcontroller having a wireless transceiver that may operate according to one or more wireless protocols (e.g., WLAN-OFDM, WLAN-DSSS, Bluetooth, BLE, among others), or other device that can be used in a variety of use cases, including sensing, metering, monitoring, embedded applications, communications, applications and so forth, and which may be particularly adapted for use in an IoT device.

In the embodiment shown, integrated circuit 700 includes a memory system 710 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for processing an incoming signal, including performing cluster correlator operations, and using correlator outputs to perform timing detection in accordance with an embodiment.

Memory system 710 couples via a bus 750 to a digital core 720, which may include one or more cores and/or microcontrollers that act as a main processing unit of the integrated circuit. In turn, digital core 720 may couple to clock generators 730 which may provide one or more phase locked loops or other clock generator circuitry to generate various clocks for use by circuitry of the IC.

As further illustrated, IC 700 further includes power circuitry 740, which may include one or more voltage regulators. Additional circuitry may optionally be present depending on particular implementation to provide various functionality and interaction with external devices. Such circuitry may include interface circuitry 760 which may provide interface with various off-chip devices, sensor circuitry 770 which may include various on-chip sensors including digital and analog sensors to sense desired signals, such as for a metering application or so forth.

In addition as shown in FIG. 7, transceiver circuitry 780 may be provided to enable transmission and receipt of wireless signals, e.g., according to one or more of a local area or wide area wireless communication scheme, such as Zigbee, Bluetooth, BLE, IEEE 802.11, IEEE 802.15.4, cellular communication or so forth. As shown, transceiver circuitry 780 includes a cluster correlator 785 that may be implemented with significantly less die area than a conventional correlator, as described herein. Understand while shown with this high level view, many variations and alternatives are possible.

Figure 8:
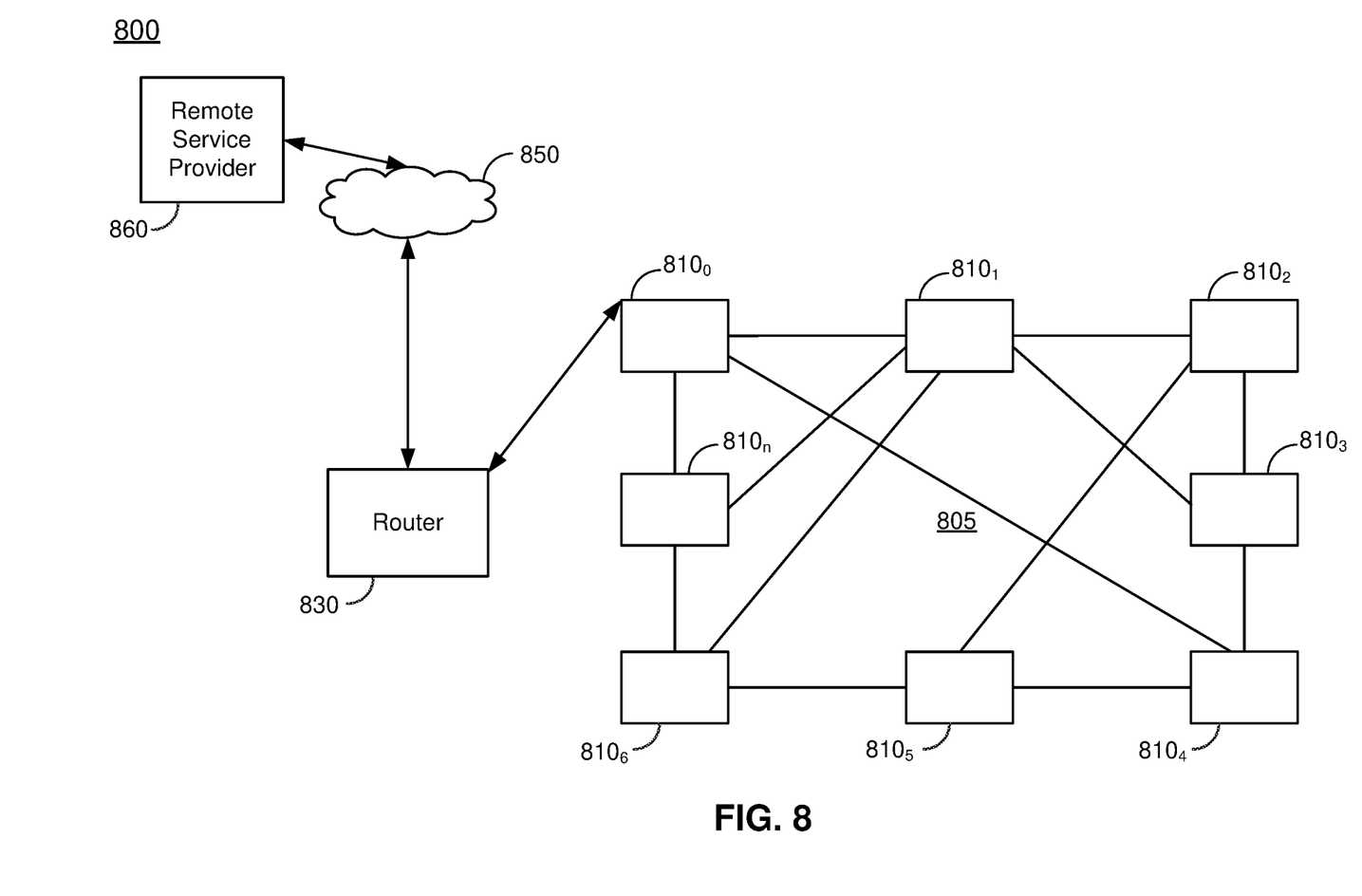
FIG. 8 is a block diagram of a system in accordance with an embodiment.

Note that ICs such as described herein may be implemented in a variety of different devices such as an IoT device for use in a smart utility network, e.g., a mesh network in which communication is according to an IEEE 802.15.4 specification or other such wireless protocol. Referring now to FIG. 8, shown is a high level diagram of a network in accordance with an embodiment. As shown in FIG. 8, a network 800 includes a variety of devices, including smart devices such as IoT devices, routers and remote service providers. In the embodiment of FIG. 8, a mesh network 805 may be present, e.g., in a building having multiple IoT devices $810_{0-n}$. Such IoT devices may include transceivers having a cluster correlator as described herein. As shown, at least one IoT device 810 couples to a router 830 that in turn communicates with a remote service provider 860 via a wide area network 850, e.g., the internet. In an embodiment, remote service provider 860 may be a backend server of an entity that handles communication with IoT devices 810. Understand while shown at this high level in the embodiment of FIG. 8, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a first stage comprising a set of first correlators, each of the first correlators to receive cyclically distributed samples from an input signal during a switching cycle of the first stage, the first correlators to correlate samples of the input signal with a first predetermined pattern and output an output sample, the set of first correlators to output a sample cluster corresponding to the output sample of the set of first correlators during the switching cycle of the first stage;
   a filter coupled to an output of the first stage, the filter to receive the sample cluster and to produce a processed output sample based on the sample cluster; and
   a second stage comprising a set of second correlators, comprising at least one second correlator, each of the second correlators to receive a processed output sample from the filter and correlate the processed output sample with a second predetermined pattern, the set of second correlators to output correlation outputs during a switching cycle of the second stage.

2. The apparatus of claim 1, further comprising:
   a first multiplexer to receive the input signal and to cyclically provide samples of the input signal to the set of first correlators at a first switching rate; and
   a second multiplexer coupled to the filter, the second multiplexer to receive the processed output sample and to cyclically provide the processed output sample to the set of second correlators at a second switching rate.

3. The apparatus of claim 2, wherein the first multiplexer is to cyclically switch at a rate of Fs and the second multiplexer is to cyclically switch at a rate of Fs/k, wherein Fs is a sampling rate of the input signal and k is a number of the set of first correlators.

4. The apparatus of claim 1, wherein the filter is to produce the processed output sample of the sample cluster based at least in part on a number of positive output samples and a number of negative output samples from the set of first correlators.

5. The apparatus of claim 1, further comprising a timing detection circuit coupled to the second stage, the timing detection circuit to determine a timing of the input signal and to output a timing signal based on the timing determination.

6. The apparatus of claim 5, further comprising a memory to store incoming samples of the input signal, wherein the memory comprises a memory controller to control output of the incoming samples based at least in part on the timing signal.

7. The apparatus of claim 6, wherein after the timing determination, the first stage is to receive the incoming samples of the input signal from the memory to track timing.

8. The apparatus of claim 1, wherein:
   the set of first correlators are configured with a first length, the first length equal to Lp/k, where Lp is a length, expressed in samples, of a repeated pattern in a header of a packet and k is a number of the set of first correlators; and
   the set of second correlators are configured with a second length, the second length equal to Lw/Lp, where Lw is a detection window length expressed in samples.

9. A method comprising:
   correlating, in a plurality of first correlators of a first stage of a correlator circuit, a plurality of samples of an input signal comprising a packet, at an oversampling rate, and providing a sample cluster from the plurality of first correlators to a filter;
   producing, via the filter, a processed sample, based on the sample cluster and providing the processed sample to a second stage of the correlator circuit;
   correlating, in a set of second correlators of the second stage of the correlator circuit, the set of second correlators comprising one or more second correlators, the processed sample of a plurality of sample clusters, and outputting a correlation output from the set of second correlators to a timing detection circuit; and
   determining, in the timing detection circuit, a timing of the packet based at least in part on the correlation output from the set of second correlators.

10. The method of claim 9, further comprising receiving the input signal in a first input multiplexer and cyclically providing a sample of the input signal to each of the plurality of first correlators during a switching cycle of the first stage.

11. The method of claim 10, further comprising:
   providing the samples to the plurality of first correlators at an oversampling rate; and
   providing the processed sample to the set of second correlators at a downsampling rate.

12. The method of claim 9, wherein performing the timing detection comprises performing a coarse timing and performing a fine timing.

13. The method of claim 12, wherein the coarse timing comprises:
   when a current correlation output from the set of second correlators exceeds a detection threshold, identifying a highest correlation output of the set of second correlators; and
   identifying, of the set of second correlators, a previous correlation output and a next correlation output adjacent to the current correlation output.

14. The method of claim 13, wherein performing the fine timing comprises:
   selecting a sample phase for the fine timing detection, based at least in part on a comparison of the current correlation output, the previous correlation output and the next correlation output.

15. The method of claim 9, wherein producing the processed sample comprises:
   selecting a sample of the sample cluster having a highest absolute value when there are equal numbers of positive and negative samples of the sample cluster.

16. The method of claim 9, wherein selecting the one sample of the sample cluster comprises:
   selecting a highest positive sample when a number of positive samples of the sample cluster exceeds a number of negative samples of the sample cluster; and
   selecting a highest negative sample when a number of negative samples of the sample cluster exceeds a number of positive samples of the sample cluster.

17. The method of claim 14, wherein selecting the sample phase for the fine timing detection is based on selecting a second highest correlation output from the previous and next correlation outputs, and a comparison of the current correlation output to a sum of the second highest correlation output and a phase detection threshold.

18. A system comprising:
- a receiver to receive a radio frequency (RF) signal, the receiver comprising:
  - a RF front end circuit to process the RF signal into a lower frequency signal;
  - a baseband processor coupled to the RF front end circuit, the baseband processor comprising:
    - a COordinate Rotation Digital Computer (CORDIC) engine to transform the lower frequency signal to a phase signal;
    - a differential circuit coupled to the CORDIC engine, the differential circuit to differentiate the phase signal;
    - a memory coupled to the differential circuit to store samples of the phase signal;
    - a correlation circuit coupled to the differential circuit to receive the samples of the phase signal, the correlation circuit comprising:
      - a plurality of first correlators to correlate the samples of the phase signal with a first predetermined pattern and output, during a first switching cycle, a sample cluster comprising an output sample from each of the plurality of first correlators;
      - a filter coupled to the plurality of first correlators, the filter to receive the sample cluster and to produce a processed output sample of the sample cluster; and
      - at least one second correlator coupled to the filter, wherein during the first switching cycle one of the at least one second correlator is to receive a selected output sample from the filter and correlate the selected output sample with a second predetermined pattern, and output a correlation output; and
    - a demodulator coupled to the memory to demodulate the samples of the phase signal into a demodulated signal.

19. The system of claim 18, further comprising a timing detection circuit coupled to the at least one second correlator, the timing detection circuit to determine a timing of a packet included in the RF signal based on the correlation output and to provide a timing signal to the memory based on the timing determination.

20. The system of claim 18, wherein:
- the plurality of first correlators are configured with a first length, the first length equal to Lp/k, where Lp is a length of a repeated pattern in a header of a packet and k is a number of the plurality of first correlators; and
- the at least one second correlator is configured with a second length, the second length equal to Lw/Lp, where Lw is a detection window length.

* * * * *